United States Patent [19]

Matsumoto et al.

[11] 4,214,561
[45] Jul. 29, 1980

[54] INDUCTION SYSTEM FOR AN INTERNAL COMBUSTION ENGINE

[75] Inventors: Hiromitsu Matsumoto; Ryuichi Yamashita, both of Hamamatsu, Japan

[73] Assignee: Yamaha Hatsukoki Kabushiki Kaisha, Shizuoka, Japan

[21] Appl. No.: 911,402

[22] Filed: Jun. 1, 1978

[30] Foreign Application Priority Data

Sep. 9, 1977 [JP] Japan .................................. 52-108489

[51] Int. Cl.² ............................................. F02D 39/02
[52] U.S. Cl. ................................... 123/432; 123/442; 123/124 R; 261/41 D
[58] Field of Search ............. 123/75 B, 124 A, 124 R, 123/26, 119 R; 261/41 D

[56] References Cited

U.S. PATENT DOCUMENTS

| | | | |
|---|---|---|---|
| 2,011,993 | 8/1935 | Aseltine | 123/75 B |
| 3,283,751 | 11/1966 | Goossak et al. | 123/119 R |
| 3,338,568 | 8/1967 | Mangoletsi | 123/122 AB |
| 3,456,634 | 7/1969 | Nelson | 123/122 AB |
| 3,543,736 | 12/1970 | Suzuki et al. | 123/122 A |
| 3,721,222 | 3/1973 | Shioya et al. | 123/124 A |
| 3,994,268 | 11/1976 | Okunishi et al. | 123/75 B |
| 4,089,308 | 5/1978 | Pierlot | 123/119 R |
| 4,117,808 | 10/1978 | Takamiya | 123/75 B |

*Primary Examiner*—Ira S. Lazarus
*Assistant Examiner*—Magdalen Moy
*Attorney, Agent, or Firm*—E. A. Beutler

[57] ABSTRACT

An induction system for an internal combustion engine that is provided with a relatively small auxiliary intake passage that delivers the intake charge to the combustion chamber at a high velocity and high degree of turbulence. Throttle valve means are provided for directing a substantial portion of the idle and low-speed intake into the chamber through this auxiliary intake passage so as to improve flame propagation and engine performance under these running conditions. The intake for the auxiliary induction passage is disposed so that it will be exposed to atmospheric pressure under at least some low-speed running characteristics so as to improve the amount of charge drawn through the auxiliary induction passage during these conditions.

13 Claims, 4 Drawing Figures

INDUCTION SYSTEM FOR AN INTERNAL COMBUSTION ENGINE

BACKGROUND OF THE INVENTION

This invention relates to an induction system for an internal combustion engine and more particularly to an induction system for improving low-speed running performance.

The difficulties with obtaining smooth running, good fuel economy and effective emission control at idle or low-speed with internal combustion engines is well-known. One of the main reasons for these difficulties is the slow-flame travel which is experienced in the combustion chamber under these circumstances. This problem is aggravated by the slow speed at which the charge passes through the induction system under these running conditions, which tends to cause condensation of fuel in the intake passages and which aggravates the slow-speed running problems aforenoted. In order to overcome these difficulties, it has been proposed to provide a relatively small auxiliary induction passage through which the intake charge is delivered to the combustion chambers during idle and slow-speed running. This arrangement has been found to greatly improve slow-speed running, fuel economy and emission control. With such arrangements, however, it has been found that the speed at which the intake charge passes through the auxiliary induction passage is still retarded due to the restricted pressure at the upstream side of this passage.

It is, therefore, a principal object of this invention to provide an improved induction system for an internal combustion engine.

It is another object of the invention to provide an induction system for an internal combustion engine that improves slow-speed running characteristics.

It is a still further object of the invention to provide an auxiliary induction system for slow-speed running of an internal combustion engine that accommodates greater airflows.

SUMMARY OF THE INVENTION

This invention is adapted to be embodied in an internal combustion engine having a variable volume chamber in which combustion occurs, a main intake passage communicating with the chamber through a main intake port and a sub-intake passage that communicates with the chamber through a sub-intake port. The sub-intake passage has an effective cross-sectional area at the sub-intake port substantially less than the effective cross-sectional area of the main intake port causing a given mass flow of charge through the sub-intake port to enter the chamber at a significantly greater velocity. Throttle valve means control the ratio of communication of the ports for the chamber during a given cycle of operation of the engine. In connection with this feature of the invention, the intake of the sub-intake passage is exposed to substantially atmospheric pressure during at least a portion of the low-speed operation of the engine so as to maximize the charge flowing through the sub-intake passage.

Another feature of the invention is also adapted to be embodied in an internal combustion engine having main and sub-intake passages as defined in the immediately preceding paragraph. In connection with this feature of the invention, means are provided for altering the pressure at the intake side of the sub-intake passage in response to engine load for significantly increasing the pressure under off-idle conditions.

DETAILED DESCRIPTION OF THE PREFERRED EMBODIMENT

Figure 1:
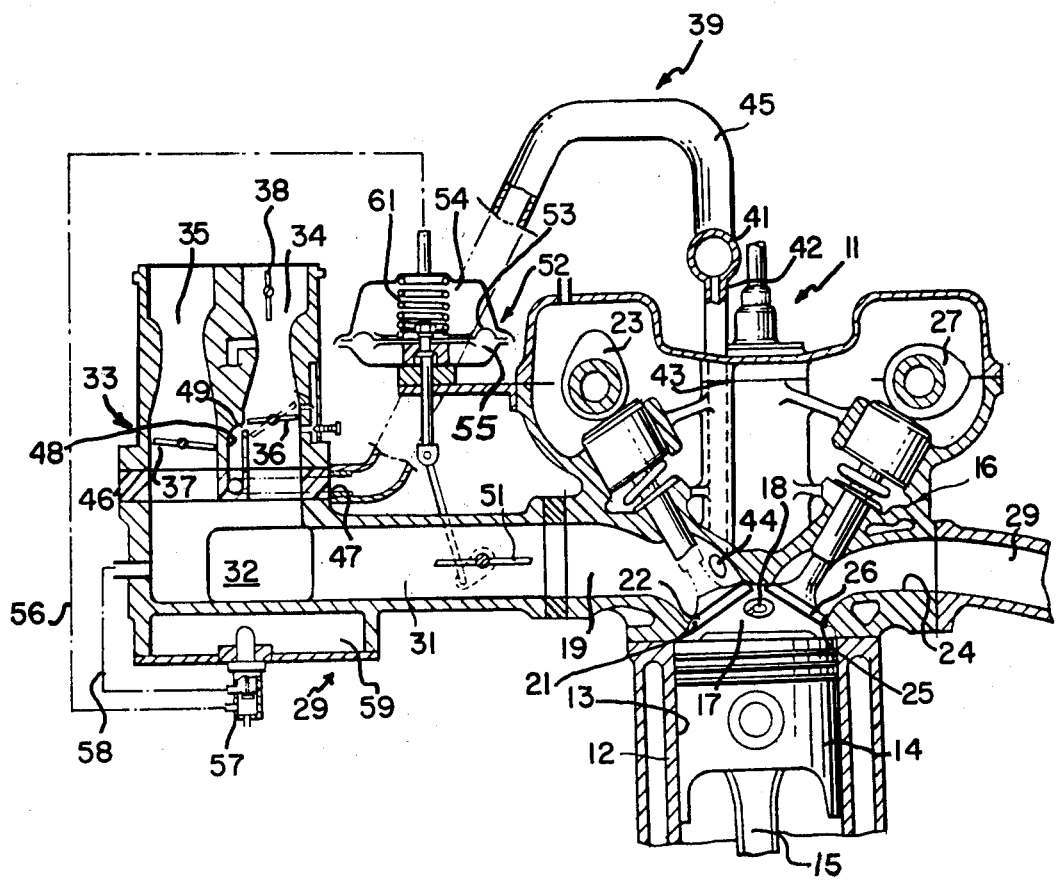
FIG. 1 is a cross-sectional view taken through a single cylinder of a multi-cylinder internal combustion engine embodying the invention.

Referring first to FIG. 1, an internal combustion engine embodying this invention is identified generally by the reference numeral 11. The engine 11 is comprised of a cylinder block 12 that forms a plurality of cylinder bores 13, only one of which appears in the drawings. Pistons 14 are slidably supported in the respective cylinder bores 13 and drive a crankshaft (not shown) by means of connecting rods 15 in a known manner. A cylinder head 16 is affixed to the cylinder block 12 and defines with the pistons 14 a plurality of combustion chambers 17. Spark plugs 18 are supported in the cylinder head 16 for firing the charge in each of the chambers 17.

The cylinder head 16 is formed with a plurality of inlet passages 19, there being one such passage for each cylinder bore 13. The cylinder head main intake passages 19 terminate in inlet ports 21 and flow through the ports 21 is controlled by a respective inlet valve 22. The inlet valves 22 are driven by means of an inlet camshaft 23.

An exhaust passage 24 is also formed in the cylinder head 16 for each cylinder bore 13. The exhaust passages 24 communicate with the combustion chambers 17 through exhaust ports 25. Exhaust valves 26 control the flow through the exhaust passages 24. An exhaust camshaft 27 is provided that drives the exhaust valves 26 in a known manner. An exhaust manifold 28 is provided for collecting the exhaust gases from the exhaust ports 26 and discharging them via a muffler or the like (not shown).

An intake manifold, indicated generally by the reference numeral 29, is provided for delivering a charge to the combustion chambers 17. The intake manifold 29 has a plurality of main intake passages 31, there being one such passage for each main cylinder head intake passage 19. The manifold intake passages 31 are all served by a common chamber 32 which is positioned beneath and fed by a carburetor, indicated generally by the reference numeral 33.

The carburetor 33 is of the two-stage, two barrel type and includes a primary barrel 34 and a secondary barrel 35. Primary and secondary throttle valves 36 and 37 control the flow through the barrels 34, 35, respectively. The primary throttle valve 36 is adapted to be operated manually by the accelerator pedal of the associated vehicle (not shown) in a known manner while the secondary throttle valve 37 may be operated either automatically depending upon engine load or mechanically in staged sequence with the primary throttle valve 36 or a combination of both, as is well known in this art.

As is also well-known, a choke valve 38 is positioned in the primary barrel 34 for providing cold starting enrichment.

The primary and secondary barrels 34, 35 are provided with respective fuel supply systems as are well-known in this art and, for that reason, will not be described in detail. The construction of the engine 11 thus far described is also conventional and, for that reason, more detailed discussion of its structure and operation is not believed to be necessary.

In addition to the primary induction system and in accordance with this invention, the engine 11 is provided with an auxiliary or sub-intake system, indicated generally by the reference numeral 39. The sub-intake system 39 includes a sub-intake manifold 41 having a number of branch pipes 42 equal in number to the number of cylinder bores 13. The branch pipes 42 cooperate with respective sub-intake passages 43 formed in a cylinder head 16 each of which terminates in a sub-intake discharge port 44. The sub-intake discharge port 44 is positioned in the cylinder head main intake passage 19 adjacent to the main intake valve port 21. It will be noted that the angle of discharge in the sub-intake port 44 to the combustion chamber 17 is substantially different from the angle of discharge of the main intake passage 19. If desired, the sub-intake ports 44 may be disposed so that the charge issuing therefrom enters into the combustion chamber 17 in a swirling pattern.

The sub-intake manifold 41 is fed by a pipe 45 that draws its inlet from the primary barrel 34 of the carburetor 33 in a manner now to be described.

A spacer plate 46 is positioned between the carburetor 33 and the intake manifold 29. The spacer plate 46 has bores that are aligned with the carburetor barrels 34 and 35. In addition, a transverse passage 47 extends through the spacer plate 46 and terminates in registry with a sub-intake inlet passage 48 formed in the carburetor 33 between the barrels 34 and 35. The sub-intake inlet 48 has an inlet port 49 that is disposed contiguous to the primary throttle valve 36 in a location to be described. The sub-intake system inlet port 49 is disposed immediately on the downstream side of the primary throttle valve 36 when the throttle valve 36 is in its idle position. As will become apparent, when the throttle valve 36 is moved toward its opened position, it will sweep the sub-inlet intake port 49 so that this port will then be exposed to the pressure on the upstream side of the primary throttle valve 36.

The sub-inlet system 39 is sized so that its effective cross-sectional area is approximately one-tenth of the effective cross-sectional area of the main intake system. Therefore, a given mass flow of charge flowing into the combustion chamber 17 from the sub-intake ports 44 will enter the chamber 17 at a substantially higher velocity than the charge entering from the main intake passages 19. The ratio of flow to the chamber 17 through the sub-intake system 39 is controlled by a plurality of throttle valves 51 positioned in the intake manifold induction passages 31. The throttle valves 51 have their position controlled by means of a vacuum actuator 52. The vacuum actuator 52 includes a diaphragm 53 that divides the interior of the actuator into an upper chamber 54 and a lower chamber 55. The lower chamber 55 is vented to the atmosphere and the upper chamber 54 is adapted to be selectively communicated with pressure in the intake manifold 29 between the throttle valves 36 and 37 and the throttle valves 51 by means including a conduit 56. The conduit 56 extends to the temperature responsive valve 57 for selective communication with the intake manifold chamber 32 by means of a conduit 58. As described in the copending application of Hiromitsu Matsumoto, entitled Induction System for Internal Combustion Engine, filed 4/13/78 Ser. No. 896,083, the temperature responsive valve 57 selectively communicates the actuator chamber 54 with pressure in the intake manifold chamber 32 or atmospheric pressure. Manifold pressure or manifold vacuum is transmitted to the chamber 54 when the temperature of a hot spot 59 of the intake manifold 29 is lower than a predetermined value. At higher temperatures, the chamber 54 is exposed to atmospheric pressure via the valve 57 and conduit 56. Alternatively, the temperature responsive valve 57 may be deleted and the chamber 54 always exposed to pressure in the intake manifold chamber 32.

A coil compression spring 61 of the actuator 52 normally urges the diaphragm 53 downwardly so that the throttle valves 51 will be held in a fully opened position. At low-loads or idling, assuming the temperature of the temperature response valve 57 is below the predetermined temperature, intake manifold vacuum will be experienced in the chamber 54 and the auxiliary throttle valves 51 will be moved toward a fully closed position so as to deflect more of the intake charge to the chamber 17 through the sub-intake system 39. As is noted in the aforenoted application of Hiromitsu Matsumoto, this arrangement improves combustion at idle and low-load conditions, permits increased fuel economy and reduces the emissions of unwanted exhaust gas constituents.

In the aforenoted application for United States Letters Patent of Hiromitsu Matsumoto, the inlet for the sub-intake passage is positioned downstream of the primary throttle valve. As a result, the inlet pressure to the auxiliary induction system is always reduced due to the restriction created by the primary throttle valve. This has been found to substantially reduce the amount of flow passing through the auxiliary induction system at off-idle loads. By positioning the auxiliary induction system intake port 49 relative to the primary throttle valve 36 in the location chosen, the flow through the auxiliary or sub-intake system 39 under off-idle conditions is significantly increased. This phenomena may be best understood by reference to FIGS. 2 and 3 and the graphical representation of FIG. 4.

Figure 2:
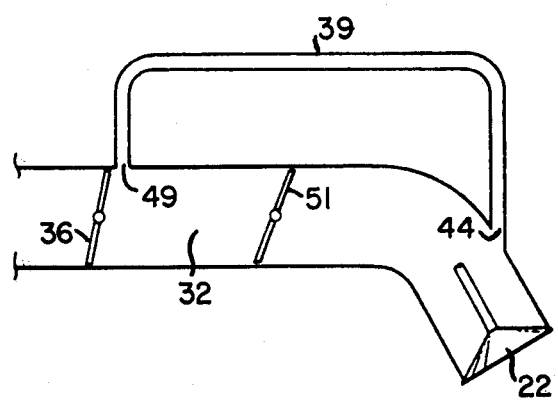
FIG. 2 is a schematic view of the induction system of the engine shown in FIG. 1 with the respective throttle valves being shown at their idle positions.

FIG. 2 illustrates the position of the primary throttle valve 36 and auxiliary or sub-throttle valve 51 during idling. Under this condition, the auxiliary throttle valve 51 is substantially closed so that all idle airflow will pass through the sub-intake system 39. The intake port 49 for the sub-intake system 39 is under this condition disposed on the downstream side of the throttle valve 36. The fuel air mixture issuing from the primary carburetor barrel 38 will flow through the passage sub-intake system 39 and be discharged into the combustion chamber 17 as previously noted.

Figure 3:
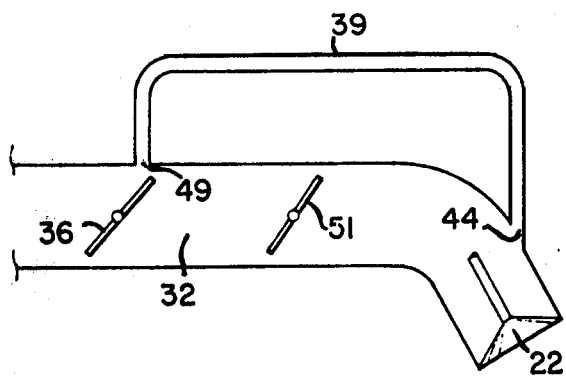
FIG. 3 is a schematic view, in part similar to FIG. 2, showing the throttle valves in an off-idle position.

In accordance with this invention, the port 49 is positioned so as to be swept by the throttle valve 36 as it moves from its idle to its off-idle position (FIG. 3). Therefore, under off-idle conditions the port 49 will be exposed to a substantially higher pressure than if it were located downstream of the primary throttle valve 36. Said another way, the port 49 will not experience the pressure drop across the primary throttle valve 36. Therefore, there will be a greater pressure differential between the inlet and outlet sides of the sub-intake system 39 to create a substantially greater airflow through the sub-intake system 39 under the off-idle conditions. This has the effect of further increasing the turbulence and/or swirl in the combustion chamber 17 and still further improving combustion characteristics under these conditions.

Figure 4:
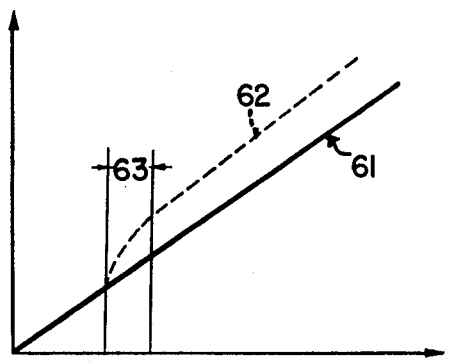
FIG. 4 is a graph showing the airflow through a prior art engine and an engine embodying this invention.

The aforenoted result may be best illustrated by reference to FIG. 4. In FIG. 4 the angular position of the throttle valve 36 is indicated by the horizontal line or ordinate. The amount of airflow through the sub-intake system 39 is indicated by the vertical line or abscissa. The airflow through a sub-intake system of a more conventional type engine, for instance that shown in the aforenoted application of Hiromitsu Matsumoto, is indicated by the solid line curve 61. It will be noted that the flow through the sub-intake system increases generally linearly in response to the opening of the main throttle valve. The flow through the sub-intake system 39 of the present invention is identified by the dotted line curve 62. It will be noted that the flow through the sub-intake system is increased considerably over that of the prior art type systems. This increase in flow is due to the greater pressure at the inlet port 49. The area 63 of the curve indicates the transition area the shape of which is determined by the location of the inlet port 49 relative to the throttle valve 36 and the size of the inlet port 49.

In the off-idle condition the fuel air mixture still flow through the sub-intake system because the port 49 is disposed downstream from the off-idle fuel discharge of the carburetor barrel 38. Thus, the system as disclosed provides an increased airflow and insures both fuel and air will flow through the sub-intake system at idle and off-idle conditions.

By placing the sub-intake system inlet port 49 downstream from the idle position in the throttle valve 36 rather than upstream of it, it is insured that idle fuel air mixture sufficient for smooth engine operation will flow through the sub-intake system 39. If the port 49 were upstream of the idle position of the throttle valve 36, only air would flow through the sub-intake system 39. Furthermore, if the inlet port 49 were positioned on the upstream side of the throttle valve 36 the sub-intake system would have to be throttled to prevent either overleannes on idle or high idle speed or both. Such restrictions would diminish the amount of airflow through the sub-intake system on off-idle conditions. Therefore, the advantages of this system are believed readily apparent.

It is to be understood that various changes and modifications may be made in addition to those described without departing from the spirit and scope of the invention, as defined by the appended claims.

What is claimed is:

1. In an internal combustion engine having a variable volume chamber in which combustion occurs, a main intake passage communicating with said chamber through a main intake port for delivering a charge thereto, a sub-intake passage communicating with said chamber through a sub-intake port, said sub-intake passage having an effective cross-sectional area substantially less than the effective cross-sectional area of said main intake passage for causing a given mass flow charge through the said sub-intake passage to enter said chamber at a significantly greater velocity, and throttle valve means for controlling the ratio of the communication of said ports with said chamber during a given cycle of operation of said engine, said throttle valve means including at least one throttle valve for throttling the flow through at least one of said intake passages, the improvement comprising the intake of said sub-intake passage being exposed to the unthrottled pressure existing on the upstream side of said one throttle valve during at least a portion of the low-load operation of said engine and only to a pressure on the downstream side of said one throttle valve during another portion of the operation of the engine.

2. An internal combustion engine as set forth in claim 1 wherein there is no throttle valve means in the sub-intake passage.

3. An internal combustion engine as set forth in claim 1 wherein the throttle valve means includes a manually operated principal throttle valve and an auxiliary throttle valve, the one throttle valve comprising one of said manually operated principal throttle valves and said auxiliary throttle valves.

4. An internal combustion engine as set forth in claim 3 wherein the intake of the sub-intake passage is disposed in a position to be swept by the one of the throttle valves during opening thereof so that said inlet is downstream of said one throttle valve when said one throttle valve is in a first position and upstream of said one throttle valve when said one throttle valve is in a second position.

5. An internal combustion engine as set forth in claim 4 wherein the intake of the sub-intake passage is in communication with the main intake passage and is positioned to be swept by the manually operated throttle valve which is also in the main intake passage, the auxiliary throttle valve being positioned downstream of said manually operated throttle valve and in the main intake passage.

6. An internal combustion engine as set forth in claims 1, or 5 wherein the sub-intake port discharges into the chamber at a substantially different angle from the main intake port.

7. An internal combustion engine as set forth in claims 1, or 5 further including engine load responsive means for controlling the throttle valve means for causing substantially all of the idle and low-load charge requirements of the engine to be delivered through the sub-intake passage.

8. An internal combustion engine as set forth in claims 1, or 5 wherein the throttle valve means is operative in response to temperature for causing substantially all of the engine charge requirements at a predetermined load to flow through the sub-intake passage when the temperature is below a predetermined value.

9. An internal combustion engine as set forth in claim 8 wherein the temperature responsive means is further responsive to engine load so that the low-load low-temperature requirements of the engine are supplied through the sub-intake passage and all other requirements are provided substantially by the main intake passage.

10. In an internal combustion engine having a variable volume chamber in which combustion occurs, a main intake passage communicating with said chamber through a main intake port for delivering a charge thereto, a sub-intake passage communicating with said chamber through a sub-intake port, said sub-intake passage having an effective cross-sectional area substantially less than the effective cross-sectional area of said main intake passage for causing a given mass flow charge through the said sub-intake port to enter said chamber at a significantly greater velocity, and throttle valve means for controlling the ratio of the communication of said ports with said chamber during a given cycle of operation of said engine, the improvement comprising the intake of said sub-intake passage being exposed to substantially atmospheric pressure at a predetermined load range of the engine and only to a pressure substantially equal to induction system vacuum at another load range.

11. An internal combustion engine as set forth in claim 10 wherein the throttle valve means includes a manually operated principal throttle valve and an auxiliary throttle valve.

12. An internal combustion engine as set forth in claim 11 wherein the intake of the sub-intake passage is disposed in a position to be swept by one of the throttle valves during opening thereof to provide the inlet pressure difference.

13. An internal combustion engine as set forth in claim 12 wherein the means for providing the pressure to the intake of the sub-intake passage comprises a single intake port for said sub-intake passage positioned on the downstream side of the manually operated throttle valve in its idle position and adapted to be swept by said manually operated throttle valve upon opening thereof from its idle position to its fully opened position.

* * * * *